US010200583B2

(12) United States Patent
Gomes Da Motta et al.

(10) Patent No.: US 10,200,583 B2
(45) Date of Patent: Feb. 5, 2019

(54) SYSTEM FOR MOBILE DEVICE WITH DETACHABLE CAMERA AND METHOD OF USE THEREOF

(71) Applicant: SAMSUNG ELETRÔNICA DA AMAZÔNIA LTDA., São Paulo (BR)

(72) Inventors: Paulo Victor Bortolini Gomes Da Motta, São Paulo (BR); Gustavo Kaneblai Martins Costa, São Paulo (BR); Renata Zilse Pereira Borges, São Paulo (BR); Rodrigo Jose Tobias, São Paulo (BR); Alexandre Barbosa Silveira, São Paulo (BR); Viviane Ortiz Delvequio Franco, São Paulo (BR)

(73) Assignee: SAMSUNG ELETRôNICA DA AMAZôNIA LTDA., Campinas-São Paulo (BR)

( * ) Notice: Subject to any disclaimer, the term of this patent is extended or adjusted under 35 U.S.C. 154(b) by 0 days.

(21) Appl. No.: 14/483,648

(22) Filed: Sep. 11, 2014

(65) Prior Publication Data
US 2016/0006920 A1 Jan. 7, 2016

(30) Foreign Application Priority Data
Jul. 3, 2014 (BR) .......................... 1020140166548

(51) Int. Cl.
H04N 5/232 (2006.01)
H04N 5/225 (2006.01)

(52) U.S. Cl.
CPC ....... *H04N 5/23203* (2013.01); *H04N 5/2252* (2013.01); *H04N 5/2257* (2013.01); *H04N 5/23209* (2013.01); *H04N 2201/0084* (2013.01)

(58) Field of Classification Search
CPC .......... H04N 5/23203; H04N 5/23206; H04N 5/23293; H04N 1/00129; H04N 1/00204; H04N 1/00209; H04N 5/2251; H04N 5/2253; H04N 5/2257; H04N 5/23209; H04N 1/00307; G03B 17/14; G03B 17/56–17/58
See application file for complete search history.

(56) References Cited

U.S. PATENT DOCUMENTS

| | | | | |
|---|---|---|---|---|
| 5,729,289 A * | 3/1998 | Etoh | ................. | H04N 1/00384 348/333.02 |
| 6,710,807 B1 * | 3/2004 | Yamagishi | ............. | H04N 5/361 348/221.1 |
| 8,992,102 B1 * | 3/2015 | Samuels | ................ | G03B 17/02 396/419 |
| 2005/0212944 A1 * | 9/2005 | Guy | ..................... | G11B 27/034 348/333.07 |
| 2008/0266401 A1 * | 10/2008 | Fry | ..................... | H04N 5/2252 348/207.1 |

(Continued)

FOREIGN PATENT DOCUMENTS

JP 2001326845 * 11/2001

*Primary Examiner* — Paul M Berardesca
(74) *Attorney, Agent, or Firm* — Staas & Halsey LLP

(57) ABSTRACT

A system which is used to obtain photographs and videos includes at least one mobile device and at least one detachable camera. The camera includes a body of flexible and magnetic polymeric material attached to a non-ferrous metal head which encapsulates the main components that interface with the main device.

6 Claims, 8 Drawing Sheets

(56) References Cited

U.S. PATENT DOCUMENTS

| | | | |
|---|---|---|---|
| 2011/0260864 A1* | 10/2011 | Dearborn | G06F 1/1616 340/540 |
| 2014/0267768 A1* | 9/2014 | Burleigh | G01J 5/025 348/165 |
| 2014/0300809 A1* | 10/2014 | Oliveira | H04N 5/232 348/376 |
| 2015/0049206 A1* | 2/2015 | Eshita | H04N 5/2251 348/207.11 |
| 2015/0334258 A1* | 11/2015 | O'Neill | H04N 1/00307 348/207.1 |
| 2016/0301849 A1* | 10/2016 | E | H04M 1/72533 |

* cited by examiner

Front view · Back view

SYSTEM FOR MOBILE DEVICE WITH DETACHABLE CAMERA AND METHOD OF USE THEREOF

CROSS-REFERENCE TO RELATED APPLICATIONS

This application claims the foreign priority benefit of Brazilian Application No. 10 2014 016654 8, filed Jul. 3, 2014, in the Brazilian Intellectual Property Office, the disclosure of which is incorporated herein by reference.

BACKGROUND

1. Field

The disclosure relates to the field of photo/video cameras for portable devices. More specifically, it relates to a mobile device system with a detachable camera and a method of use thereof, the system comprising a camera preferably having a body of flexible polymeric material and magnetic polymer material attached to a non-ferrous metal head which encapsulates the main components that interface with the mobile device.

2. Description of Related Art

For some time, video/photo cameras have been added to multifunctional portable devices such as computers, tablets and smartphones. Multifunctional devices are limited and offer little useful space in their physical body (packaging) for optical elements necessary for a photo camera. Accordingly, there is an increasing miniaturization process of these camera modules.

Moreover, nowadays, the smartphone cameras are increasingly evolving, adding new features and applications to improve the user experience in capturing images and recording several moments and situations of everyday life. So, it is noted that people are increasingly replacing the use of specific cameras by smartphone cameras, which are always available to users, and that enable sharing photos in an easier and faster manner through electronic means such as through wired and/or wireless networks (e.g., social networks).

Another trend is the use of "wearable cameras" and "action cameras", which allow the user to record images (photos, videos) while in motion and in a hands-free manner.

It would be desirable to provide a system comprising a small detachable camera and that is part of a mobile device common in the everyday life of users (e.g., smartphones), which is always available. Being detachable, it is important that the camera also be wearable and is capable of being used in a hands-free manner.

It is known in the art that some patent documents relate to cameras or parts thereof which are detachable.

Patent document U.S. Pat. No. 8,639,106 entitled: "Magnetic Add-on Lenses with Alignment Ridge", published on Jan. 28, 2014, proposes a camera system that includes a housing with an opening and an alignment feature surrounding the aperture to define an optical axis extending through the aperture. A camera module is mounted inside the housing and engages the alignment feature to align the camera module with the optical axis. The lens assembly that may have a moveable element is included in the camera module. A voice coil motor may support the moveable element of the lens assembly. A plurality of magnets is arranged on the camera module adjacent to the alignment feature to retain a detachable lens on the housing and engage the alignment feature to align the detachable lens with the optical axis. The plurality of magnets may be further arranged to minimize interference with the voice coil motor and the movement of the moveable element of the lens assembly. Unlike the solution proposed in document U.S. Pat. No. 8,639,106, according to the example embodiments disclosed herein, the camera itself (and not just the lens) is coupled/attached to the device body (e.g., a smartphone).

Patent document U.S. Pat. No. 4,855,814 entitled: "Video Camera Body and Detachable Lens Each Containing a Memory for Storing Signals Indicative of Spectral Characteristics", published on Aug. 8, 1989, discloses an image pickup system, in which the application to the video camera whose photographic lens is interchangeable and in which the light coming through the photographic lens and the image pickup system is converted into electrical signals, the aforementioned photographic lens has memory means for storing the peculiar spectral characteristic of the lens and the spectral sensitivity characteristic of the image pickup system in the form of the total spectral characteristic, readout means for obtaining information representing the memorized total spectral characteristic in the memory means, and means for controlling the white balance in accordance with the readout information. Unlike the solution proposed in document U.S. Pat. No. 4,855,814, according to the example embodiments disclosed herein, the camera itself, and not just the lens is attached/fixed to the device body (e.g., a smartphone).

Patent document U.S. Pat. No. 4,746,990 entitled: "Detachable Unit Electronic Camera", published on May 24, 1988, represents one of the earliest prior art for the concept of detachable cameras. The solution proposed in document U.S. Pat. No. 4,746,990 relates to an electronic camera, which may be used in one of several manners, including "electronic camera having the record/playback capability", "devoted playback unit" or "video camera". In such instance, a required minimum number of units can be selectively coupled together, affording a great convenience in use. Thus, capability and ease of operation of the picture monitor unit are enhanced. Therefore, the solution proposed in document U.S. Pat. No. 4,746,990 aims to provide an electronic camera that can be divided into three main detachable units, so they can be coupled together in combinations that allow four ways to use the camera. Unlike the solution proposed in document U.S. Pat. No. 4,746,990, the camera itself according to the example embodiments disclosed herein, is unique and its constituent parts are not a detachable unit.

Patent document U.S. Pat. No. 8,456,569 B2 entitled: "Camera Body And Imaging Unit Attachable To And Detachable From Camera Body, And Imaging Apparatus", published on May 5, 2011, discloses a camera body having a recess being open to three directions, that is, a lower side, a front side and a lateral side and an imaging unit to be attached to and detached from the camera body, the camera body and the imaging unit being connectable to each other accurately and improved quality of manipulation of attaching and detaching when the imaging unit is detachably attached to the camera body, and to provide an imaging apparatus. Unlike the solution proposed in document U.S. Pat. No. 8,456,569, the detachable camera according to the example embodiments disclosed herein, operates independently, either coupled or uncoupled to the device (e.g., a smartphone).

The SmartCam device supplied by Samsung is designed to allow anyone to have a monitoring camera (e.g., for security, surveillance of babies, etc.) easily. This is a compact and wireless solution, but requires a power cord. The configuration of the SmartCam is simple, provided that the user has a router on their smartphone. The next step is to download the application to the user's smartphone or configure and access the SmartCam via any web browser. The whole installation can be done via an application or browser. The user passes the data to an account, for example a YOUTUBE account, and then, the device will load 30 seconds of images to the user's account whenever there is activation by movement. Although SmartCam operates independently from the main/controller device (smartphone/tablet) as also proposed in the example embodiments disclosed herein, it does not have fixing characteristics by magnetic attraction or reduced size and its plastic base is not flexible either, like the attributes of the example embodiments disclosed herein.

Another solution commercially known is the camera GoPro Hero 3, which is able to connect to tablets and smartphones (e.g., Android, iOS, Windows Phone) via a Wi-Fi network and a specific application (Application GoPro). This application allows the smartphone/tablet fully remote control of all camera functions (e.g.: remote viewing, taking pictures, recording video, settings, sharing content on social networks and others). However, the camera GoPro Hero 3 is not an integral part of the smartphone/tablet design (it is an accessory, unlike the example embodiments disclosed herein), it is not detachable and does not have a flexible magnetized body. Additionally, the GoPro Hero application does not allow a user to simultaneously watch videos from multiple cameras, which is possible according to the example embodiments disclosed herein.

The device commercially known as Sony QX100 is a camera that can be used independently or as an accessory coupled to a smartphone. Being a compact camera without a viewfinder, when used independently it is difficult to know where the camera lens is pointing. To solve this drawback, the camera QX100 can be connected to a smartphone via Wi-Fi, which allows one to view where the lens is pointing, remotely configure some functions and transfer photos from the camera to the smartphone. Besides the Wi-Fi connection for remote control, it is also possible to attach the camera directly to the smartphone, as if it were an additional optical unit of smartphone. However, unlike the example embodiments disclosed herein, the camera QX100 has no small dimensions and is not an integral part of the smartphone, but a complementary accessory. According to the example embodiments of the disclosure, the detachable camera is the main optical unit itself and fits to the design of the smartphone.

In accordance with the aforementioned, the solutions known in the prior art are particularly related to detachable lenses (not a complete camera which is detachable) or demountable cameras in multiple parts, and these parts do not function autonomously. In summary, the existing solutions do not disclose a camera that simultaneously meets at least the following features of being detachable, flexible, and magnetic and operating independently from the main device (e.g., a smartphone).

SUMMARY

Additional aspects and/or advantages will be set forth in part in the description which follows and, in part, will be apparent from the description, or may be learned by practice of the invention.

The disclosure proposes a mobile system with a detachable camera, which has a body of flexible and magnetized polymeric material, attached to the head made of a non-ferrous metal which encapsulates the main components which may include, for example, a camera, lens, flash, microphone, camera drive button, signaling LEDs, internal battery to ensure autonomous use, data connectors and power connectors that interface with the main device (e.g., a smartphone).

The major camera features contained in the system according to the example embodiments disclosed herein include being detachable, flexible, magnetic and operating independently of the main device (e.g., a smartphone). With respect to the feature relating to detachability, the camera is part of the main device design (e.g., a smartphone) and can easily be attached to or detached from the back part of the smartphone. With respect to the feature relating to flexibility, the camera body is made of a polymer that can be flexed, such flexion remaining until a new mechanical torque is applied. With respect to the feature relating to magnetism, the camera body is made of a magnetized polymer that allows its fixation to any metal surface. With respect to the feature relating to being independent/autonomous, the camera internally comprises all the necessary components for the standard operation of a camera, and therefore does not necessarily need to be coupled to the main device (e.g., a smartphone).

The proposed objectives are achieved using a system for a mobile device with a detachable camera embedded in a recess of the mobile device. For example, the camera may include a head of non-ferrous metal comprising a microcontroller, a camera module and lens, a flash, a microphone, a capacitive button, signaling LEDs, electrical connectors that connect the camera to the mobile device, a charger module, a connectivity module comprising a technology among Wi-Fi, NFC, BLUETOOTH, etc. and an antenna, and a magnetized polymeric body with elastomeric capacity containing a thin power source. The power source may be a battery, for example, preferably formed of carbon nanotubes or lithium and connected to the head components of the detachable camera via a flexible flat cable.

The detachable camera system proposed according to the example embodiments of the disclosure works independently or combined with the mobile device and may have a size of about 64 mm×17 mm×5.6 mm.

Additionally, a method is disclosed for using the system for the mobile device with the detachable camera, the method including for example: removing the camera from the recess on the requesting mobile device, physically positioning the camera in the desired location, sending a synchronization telecommand from the camera to the mobile devices, allowing synchronization with cameras of other mobile devices, visualizing the junction of the images captured by the lenses of the synchronized mobile devices, sending the telecommand of the photo/video action to the synchronized cameras, performing corresponding photo/video action in the respective synchronized cameras, and sending the photo/video generated in the corresponding action to the requesting mobile device. Alternatively, the generated photo/video may be stored in the internal memory of the camera.

If another video is selected by the user while recording a video, the recording of a video streaming may be interrupted and may continue from the new selected video.

The connection/synchronization of multiple cameras may be done through wireless communication protocols, for example, near field communication.

BRIEF DESCRIPTION OF THE DRAWINGS

The objectives and advantages of the disclosure will become more apparent from the following detailed description of an exemplary and non-limiting embodiment from the following figures, wherein.

DETAILED DESCRIPTION

It is an objective of the disclosure to provide a system for a mobile device with a camera that simultaneously includes the following features: detachable, flexible, magnetic and operates independently of the main device (e.g., a smartphone).

Figure 1A:
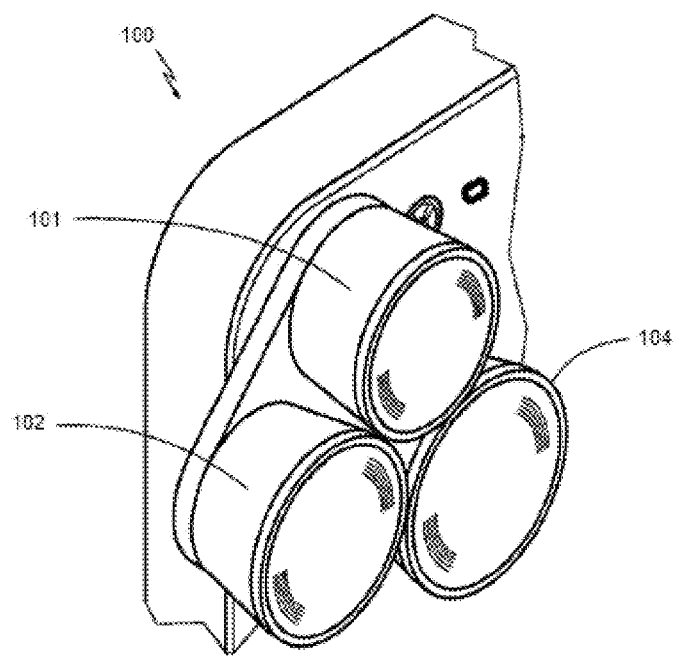
FIG. 1a shows a solution known in the prior art: a camera for capturing images containing a plurality of rotating detachable lenses fixed to the camera body via magnetic contact.
Figure 1B:
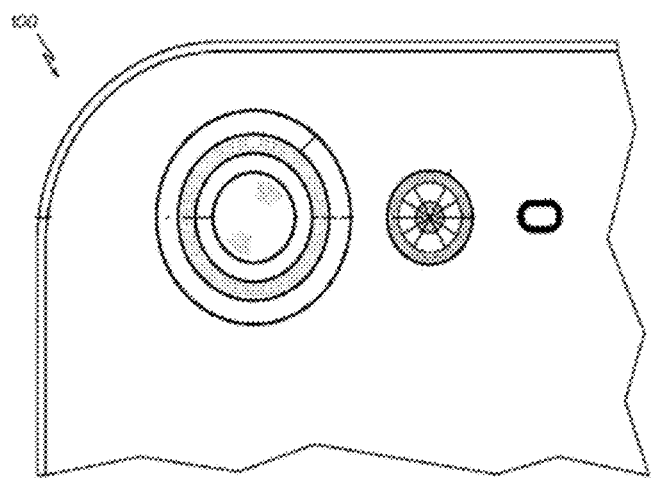
FIG. 1b shows a solution known in the prior art: a camera for capturing images containing a detachable rotating lens fixed to the camera body via magnetic contact.

FIGS. 1a and 1b show a camera 100 for capturing images known in the prior art containing one or more rotating detachable lenses 101, 102, 104 attached to the camera body 100 via magnets internal to the camera 100. An aspect according to example embodiments of the disclosure is to provide means for mounting/attaching additional lenses that work together with the existing lens in the camera of a compact device (e.g., a smartphone), that due to space limitations does not have the same mounting structures of lenses found in conventional cameras.

Figure 2:
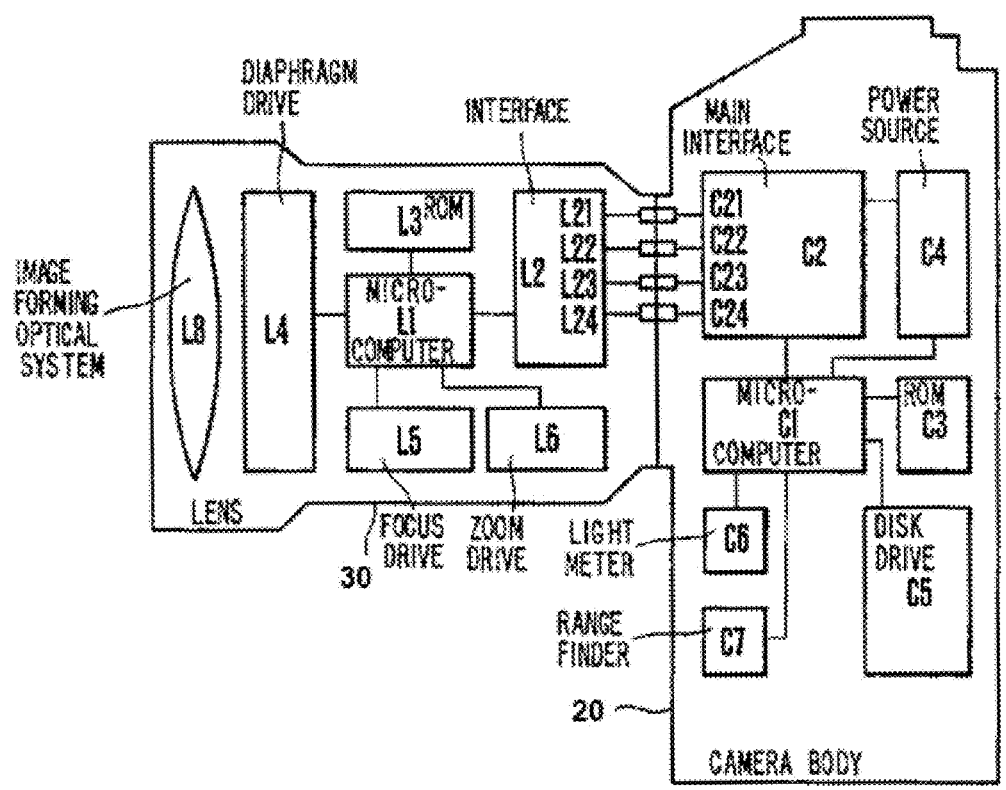
FIG. 2 shows a solution known in the prior art: an image pickup system using detachable lenses.

FIG. 2 shows an image capturing system in the prior art that includes the camera body 20 having: an image conversion device, a signal processor C1 and a detachable lens 30. The detachable lens 30 includes a memory L3 and a circuit/interface L2 to transmit the contents of memory L3 to the signal processor in the camera body 20. According to an embodiment, the system allows data of spectral characteristics from both the lens 30 and the image conversion device to be stored in the internal memory L3 of the lens 30. According to a second embodiment, the system provides data storage of spectral characteristics concerning a plurality of different types of lenses 30 in the internal memory C3 of the camera body 20 with lenses adapted for self-identification. According to a third embodiment, the internal memory C3 of the camera body 20 stores the spectral characteristic of a single lens 30 as representative of all lenses (joint use with any of such lenses). In general, aspects according to example embodiments of the disclosure relate to video cameras that provide means for adjusting the equilibrium/balance color of the video signals, and also to interchangeable lenses adapted to be used in said video camera.

Figure 3:
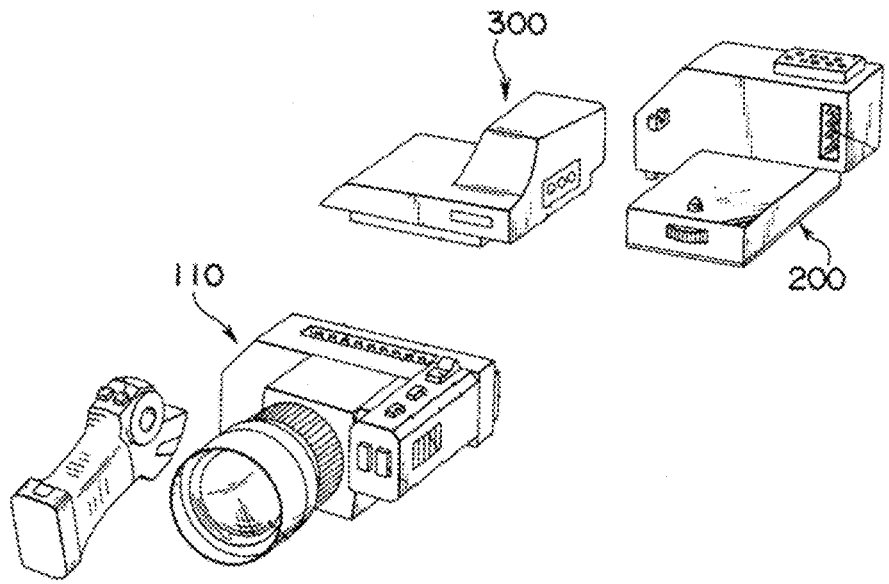
FIG. 3 shows a solution known in the prior art, which refers to an electronic camera comprising three detachable main units: a photographing unit, recording/playback unit and image control unit that can be coupled together in a combination.

FIG. 3 shows an electronic camera in the prior art composed by detachable units. The three main units are: photographing unit 110, record/playback unit 200 and picture monitor unit 300, which can be coupled together in a combination. The record/playback unit 200 is mounted against the bottom and the back surface of the photographing unit 110. The picture monitor unit 300 is adapted to be detachably coupled with the top surface of photographing unit 110 and with the top surface of the record/playback unit 200. All units 110, 200, 300 have connectors that couple together, ensuring mechanical and electrical coupling. The three main units 110, 200, 300 may be coupled in four different combinations: 1) all three units 110, 200, 300 may be coupled together and this combination results in an electronic camera capable of recording and playback; 2) the record/playback unit 200 and picture monitor unit 300 can be coupled together and this combination results in a devoted playback unit; 3) the photographing unit 110 and the picture monitor unit 300 can be coupled together and this combination results in a video camera; 4) the photographing unit 110 and the record/playback unit 200 may be coupled together and this combination results in an electronic camera devoted to the recording operation. In this case, it would be necessary to employ an optical viewfinder to monitor/display the picture being taken.

Figure 4:
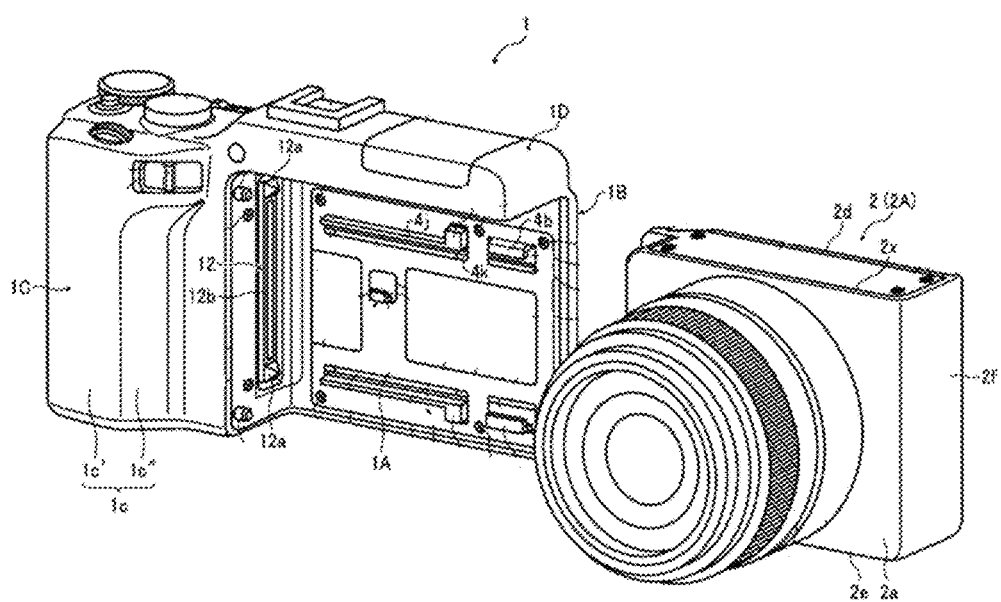
FIG. 4 shows a solution known in the prior art, whose main objective is to provide improvements in a camera body so that detachable image units of various sizes can be mechanically coupled or uncoupled, in an accurate and easy manner.

FIG. 4 presents a solution proposed in the prior art whose main objective is to provide improvements in a camera body 1 in order to obtain detachable image units 2 of various sizes being mechanically coupled or uncoupled accurately and easily. In this solution, a camera body 1 has a connector 12 and a recess 1A to attach/couple and detach/uncouple a detachable imaging unit 2 (including an optical system, an image pickup device and a connector). Both the recess 1a of the camera body 1 and the back surface of the detachable imaging unit 2 have mechanisms for alignment and engagement (grooves and ridges orientation, engagement claw, etc.) to ensure proper connection between the connector 12 of the camera body 1 and the connector of the detachable imaging unit 2. The image unit 2 and its internal components perform some functions such as image capturing, processing and compression, and image data are transmitted to a main processor/CPU contained in the camera body 1. Also, the camera body 1 internally houses many other important components for the operation of the camera in general, such as: a battery, power supply circuit, control circuit of the image unit 2, a recording medium which stores image data captured by the image unit 2, strobe control circuit, circuit board on which these components are grouped, etc. In other words, the camera only works when a detachable image unit 2 is electrically and mechanically coupled/attached in the camera body 1.

Figure 5A:
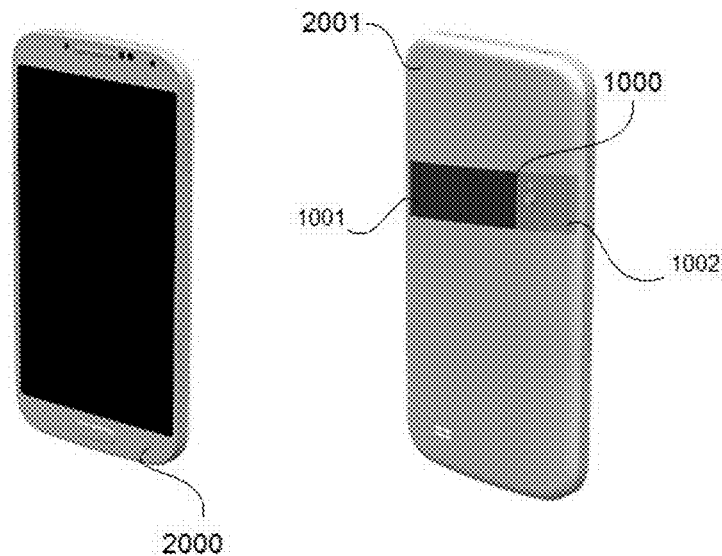
FIG. 5a shows a frontal view and back view of a smartphone system with a detachable camera attached to the rear surface of said smartphone, according to an embodiment of the disclosure.
Figure 5B:
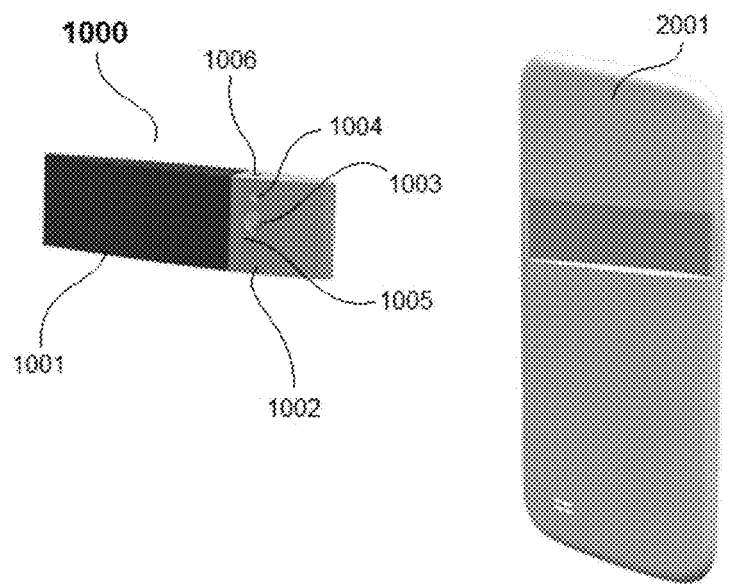
FIG. 5b shows the rear surface of the smartphone and detachable camera, according to an embodiment of the disclosure, detached from said smartphone.
Figure 5C:
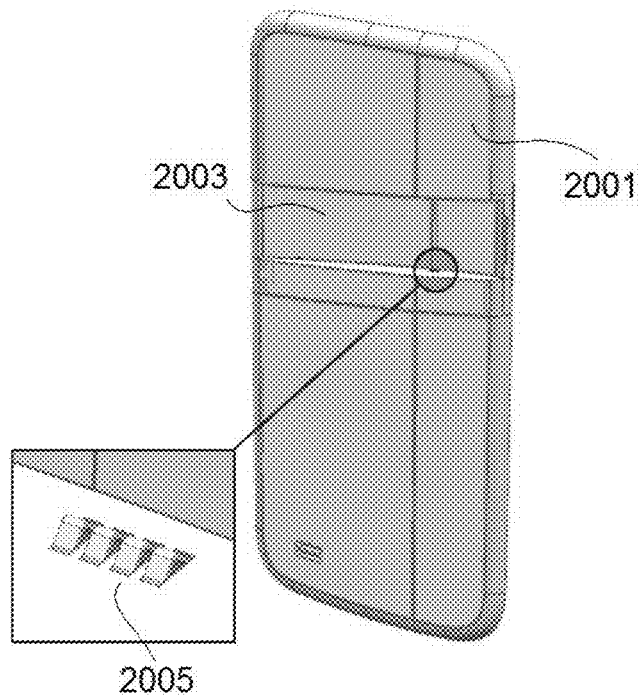
FIG. 5c also shows the rear surface of the smartphone, with a recess containing detailing data and power connectors which connects to the detachable camera, according to an embodiment of the disclosure.

In accordance with FIGS. 5a-5c, a camera 1000, in an example embodiment of the disclosure, is an integral part of the main device system 2000, including a smartphone (but could also be a tablet or other electronic devices, for example). More specifically, the camera 1000 is an integral part of the smartphone rear surface 2001, in which there is a recess 2003 for attaching said camera 1000. The recess 2003 may include a metal plate in which a magnetized polymeric body 1001 of the camera 1000 is fixed. The recess 2003 also may include electrical connectors 2005 for providing data and power/energy, which connects the camera 1000 and the smartphone 2000.

FIGS. 6a-6e show some external views and perspectives of the camera 1000, object of the disclosure.

Figure 6A:
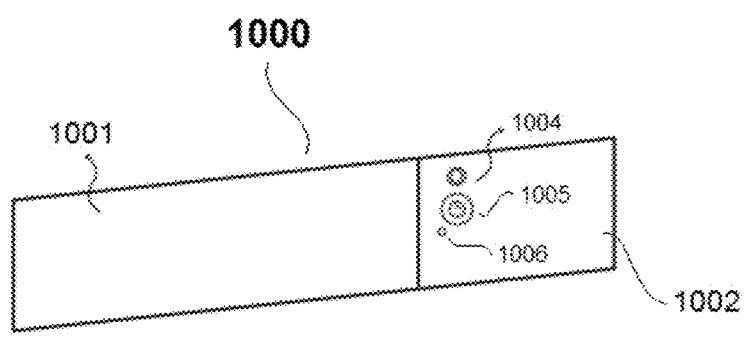
FIG. 6a is a front view of the detachable camera of the system, according to an embodiment of the disclosure.

FIG. 6a shows a front view of the detachable camera of the proposed system, being comprised of the body 1001 and a head 1002. The head 1002 of the detachable camera may be externally composed of a flash 1004 that brightens the region next to the camera to be photographed, and a microphone 1005 that captures audio and a capacitive button 1006 for manual driving/triggering.

Figure 6B:
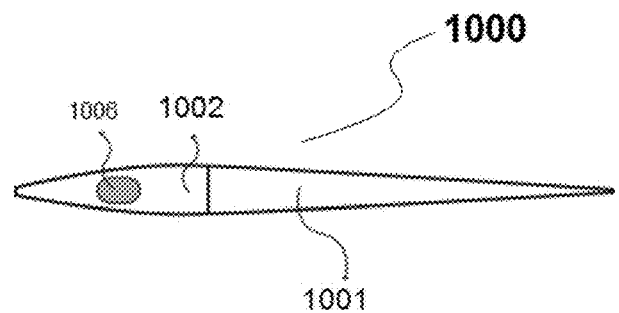
FIG. 6b shows the top view of the detachable camera of the system according to an embodiment of the disclosure.

FIG. 6b shows a top view of the detachable camera 1000 of the system, which may include a body 1001 and a head 1002. Capacitive button 1006 for manual driving/triggering may be provided in the head 1002 of the detachable camera 1000.

Figure 6C:
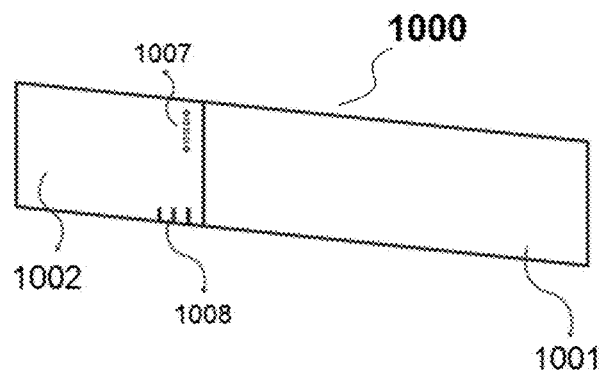
FIG. 6c is a back view of the detachable camera of the system according to an embodiment of the disclosure.

FIG. 6c shows a back view of the detachable camera 1000 in the proposed system, being comprised of a body 1001 and a head 1002. A LED 1007 may be used for signaling the status of the camera 1000. For example, LED 1007 may emit a first continuous light (e.g., a green light) when the camera is turned on, the LED 1007 may emit a second continuous light (e.g., a yellow light) when the camera focuses, the LED 1007 may emit a third continuous (e.g., a red light) when the battery is low, and the LED 1007 may emit a blinking light (e.g., a blinking red light) when the camera 1000 is far away from the smartphone 2000. Moreover, electrical connectors 1008 may be arranged in the head 1002, through which the camera 1000 is connected to the connectors 2005, present (disposed) in the recess 2003 on the rear surface 2001 of the smartphone 2000.

Figure 6D:
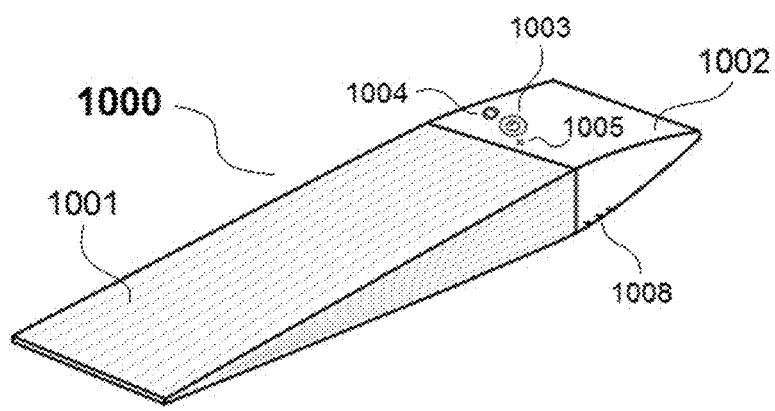
FIG. 6d shows a perspective view of the front surface and lower surface of the detachable camera of the system according to an embodiment of the disclosure.

In FIG. 6d, it is shown a front view in perspective of the camera 1000 of the system according to an example embodiment of the disclosure, comprising the body 1001 and the head 1002. A camera module and lens 1003 for capturing images and videos, flash 1004 and microphone 1005 to capture audio are arranged in the head 1002. At the bottom rear part of the head 1002 are found electrical connectors 1008.

Figure 6E:
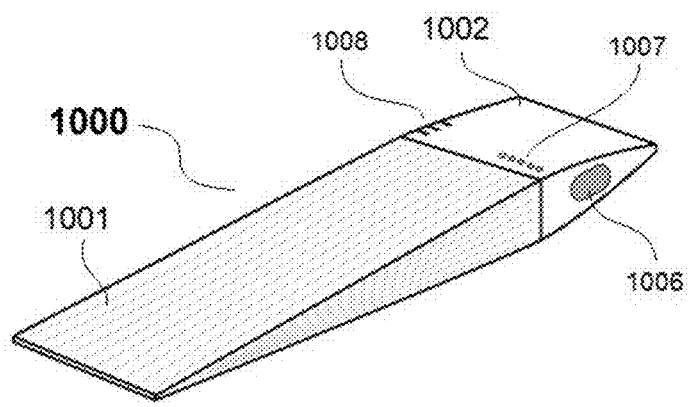
FIG. 6e shows a perspective view of the rear surface and upper surface of the detachable camera of the system according to an embodiment of the disclosure.

FIG. 6e shows a back view in perspective of the camera 1000 of the system according to an example embodiment of the disclosure, comprising the body 1001 and the head 1002. LEDs 1007, the electrical connectors 1008 and the capacitive button 1006 may be disposed in the head 1002 of the detachable camera 1000.

Figure 6F:
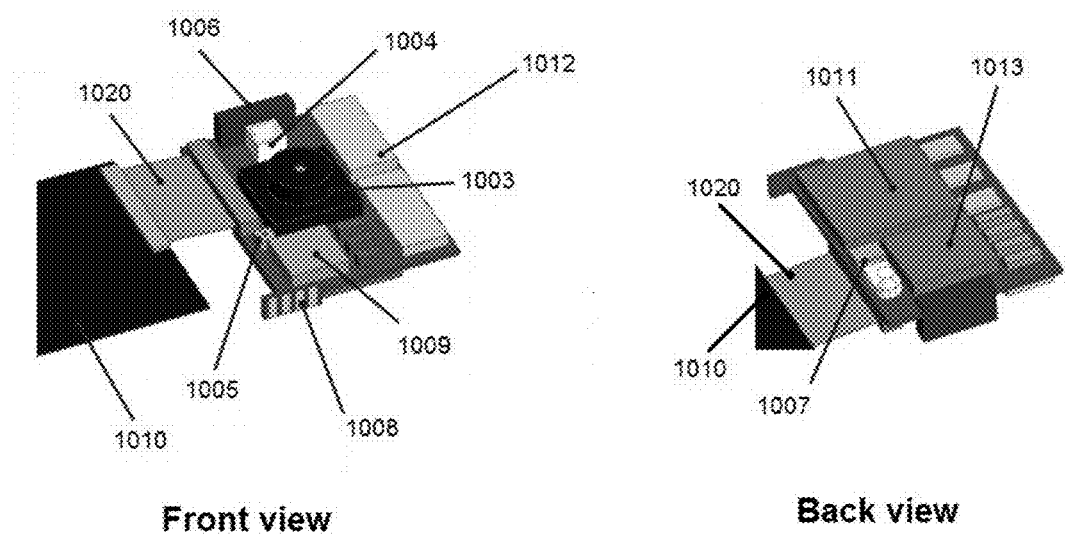
FIG. 6f shows front and back views of the internal components of the detachable camera of the system according to an embodiment of the disclosure.

FIG. 6f shows front and back views of the internal components of the camera 1000 of the system according to an example embodiment of the disclosure. The camera 1000 presents reduced dimensions and includes basically of two main parts mechanically integrated with each other. For example, the camera 1000 may include the body 1001, as shown in FIGS. 6a-6e, including magnetizable/magnetized polymers and with elastomeric capacity (flexibility) to receive a mechanical torsion and keep in the flexed position until a new torsion is applied. As shown in FIG. 6f, internally to the body 1001 is housed a thin and flexible power source 1010, such as a battery (e.g., formed of carbon nanotubes or lithium). The power supply 1010 may be connected to other components housed in the head 1002 via a flexible flat cable or FFC 1020. The main advantage of housing the power supply 1010 inside the body 1001 is to provide a larger battery with more autonomy and to save the limited internal space of the head 1002. For example, the camera 1000 may also include head 1002 which may be made of non-ferrous metal, which encapsulates all internal components commonly used in a current camera and other components specific to the camera 1000.

FIG. 6f shows major components internal to the head 1002 of the camera 1000, which may include controller plates or microcontrollers 1011 for signal processing, a camera module and lens 1003 to capture images and videos, a flash 1004, a microphone 1005 to capture audio, a capacitive button 1006 for manual driving/shooting, and a LED 1007 for signaling the status of the camera 1000. For example, the 1007 LED emits a continuous green light when the camera is turned on, the LED 1007 emits a continuous yellow light when the camera focuses, the LED 1007 emits a continuous red light when the battery is low, and the LED 1007 emits a blinking red light when the camera 1000 is far away from the smartphone 2000. FIG. 6f further shows major components internal to the head 1002 of the camera 1000, which may also include electrical connectors 1008, which enable the camera 1000 to connect to the connectors 2005 in the recess 2003 at the rear surface 2001 of the smartphone 2000, a charge module 1009, coupled to the connectors 1008, to charge the power source 1010 while the camera 1000 is connected to the smartphone 2000, and a connectivity or wireless module 1012 (e.g., to connect over a wireless network via Wi-Fi, NFC, BLUETOOTH, or other wireless networks), which operating together with the antenna 1013, enables communication between the camera 1000 and smartphone 2000, for example, when the camera is detached.

As shown in FIGS. 6a-6e, on the external front side of the head 1002 there are orifices to externalize lens 1003, the flash 1004 and microphone 1005. On the external top side of the head 1002 there is the capacitive button 1006. On the external back side of the head 1002 there is one or more orifices corresponding to LED 1007. On the external back side and lower side of the head 1002, there are electrical connectors 1008 to provide an interface between the camera 1000 and the smartphone 2000 through connectors 2005.

Considering the dimensions of the current smartphones, in an example embodiment of the disclosure, the camera system 1000 may have a size of about 64 mm×17 mm×5.6 mm (preferably at least 1.0 mm), and the body 1001 measures about 44 mm×17 mm×5.6 mm (preferably at least 1.0 mm) and the head 1002 may have the following dimensions of about 20 mm×17 mm×5.6 mm (preferably at least 1, 0 mm).

When the camera 1000 is attached to the smartphone 2000, as in FIG. 5a, its operation may be similar to the existing and generally known smartphone camera modules.

Figure 7:
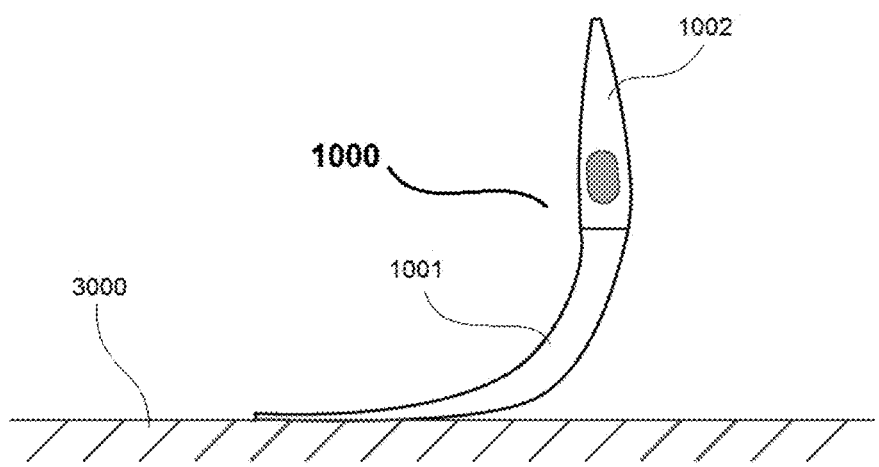
FIG. 7 illustrates a case of use of the system for mobile device with detachable camera, according to an embodiment of the disclosure, showing some of its main features: flexible and magnetic, being also detached from the smartphone and used independently/autonomously.

When it is detached from the smartphone 2000 as the example of FIG. 5b and FIG. 7, the camera 1000 works perfectly as an autonomous device and independently of its smartphone 2000, the mobile device. That is at least one distinguishing feature of the proposed system with a mobile device including a detachable camera 1000 in comparison to other systems of mobile devices with cameras known on the market.

FIG. 7 shows two additional features of the detachable camera 1000, being also detached from the smartphone 2000 and used independently/autonomously. As already described, the body 1001 of the camera 1000 is flexible and magnetic, allowing its use in different situations, such as: fixing on metal surfaces 3000, fixing on sports equipment (helmets, bikes, belts, etc.), fixing on pet collars, bending the camera 1000 body 1001 to get the best angles and views, etc.

In addition to the hardware features, to ensure proper function for the camera 1000 there must be software or an application (app) installed on the smartphone 2000. This application may allow, for example, the configuration, remote control and connection/synchronization among multiple cameras 1000. The application may also allow photo view, video viewing and streaming recording. For remote control and camera 1000 settings, the application may provide icons/options/buttons for basic functions already known for smartphone cameras (video recording, photograph, image and video gallery, switch to front/rear cameras, settings—definition image, colors, etc.). For connection/synchronization of multiple cameras 1000, the application may support wireless communication protocols, including NFC (Near Field Communication) for example, in which the communication among the devices is automatically established (without additional settings). The application may allow simultaneous viewing of streaming video from multiple cameras 1000. Due to physical dimensions of the smartphone 2000 screen, the most appropriate number of simultaneous views may be limited, (e.g., to a maximum of 4 streaming videos which corresponds to the user's own smartphone camera and three other cameras). If the video streamings are displayed on a TV, for example, the number of views may be greater.

Examples of Use

When the user detaches the camera 1000 of the mobile system, it may be automatically detected by the smartphone 2000 to open the camera 1000 application (e.g., on the smartphone 2000). For example, the user may lay the camera 1000 on a table or desk, and then sit on a chair at some distance from the camera 1000. From the software on the smartphone screen 2000, the user may view the scene on the screen of the smartphone 2000 which reproduces the image being captured by the camera 1000. Thus, the user may take a photo of himself or herself (i.e., a selfie) at a distance from the camera 1000. When the user touches his or her finger on the icon/photo option at the touchscreen, the smartphone 2000 sends a telecommand to actuate the camera 1000 through a wireless network (Wi-Fi, NFC, Bluetooth, or other). The camera 1000 receives the telecommand through the wireless network module, forwards it to the control and processing board, which interprets this telecommand and triggers a corresponding action, in this case "take photo". Upon taking a photo and processing it, the camera 1000 preferably sends the image file to the smartphone 2000 via a wireless network (the reversal path to that described for the telecommand). Optionally, or additionally, the camera 1000 may also have an internal memory for temporary storage of some photos that would be "downloaded" to the smartphone 2000 when the camera 1000 gets attached again. Upon receiving the image file on the smartphone 2000, the application may display the photo on the screen for a certain period and automatically send it to images/videos gallery. The user may then touch his or her finger on the touchscreen on the images/videos gallery icon/option, touch on the picture and the software displays on the screen a menu with possible actions for that photo (e.g., share, edit, delete, resize, detail, etc.). For example, the user may select the option to share and promote his photo on a given social network.

In another example of use, two users may detach their cameras 1000 from their systems, join the body 1001 of each camera 1000 with each other, fixing them together magnetically. The cameras 1000 send a telecommand to their respective smartphones 2000, the software then requests authorization to each user to synchronize the cameras 1000. Upon receiving the authorization, the first user selects the option to take a picture, and what is seen on the screen is the merge/union of the images being captured by the lenses 1003 from both cameras 1000. The first user may then touch his or her finger on the touchscreen on the icon/photo option. The smartphone 2000 of the first user sends through a wireless network a driving telecommand to the two synchronized cameras 1000. In this case, both cameras 1000 receive the telecommand and take the corresponding action, in this case "take a photo". Both cameras 1000 send the image file to their respective smartphones 2000 through a wireless network (reversal path from telecommand). In the same way it has been described on the previous example, when the image file is received in their respective smartphones 2000, users can see the photo on the screen for a certain period and the software automatically sends it to the image/videos gallery. Bonding two or more cameras 1000 allows users to create expanded formats and/or panoramic photos.

In a further example of use, four users detach their cameras 1000 and touch lightly on one of the smartphones 2000, for example, the first user, creating a network/connection between four cameras 1000. The first user touches his finger in a touchscreen on the icon/photo option, the smartphone 2000 of the first user sends via the wireless network a telecommand to the four cameras 1000, which are synchronized. In this case, the four cameras 1000 receive the telecommand and take the corresponding action, in this case "video". The four cameras 1000 send video streamings to the smartphone 2000 from the first user through wireless network (reversal path from telecommand). The software shall show the videos from the four cameras 1000 at the smartphone screen from the first user. If the first user clicks at one of the videos, the software starts recording its video streaming. If the first user clicks another video, the software stops recording the previous video streaming and continues recording from the other video selected. Alternatively, the software may record both videos simultaneously. An icon/option on the software screen allows video recording to be finished, generating a video file which may be a composition of many video streamings selected by the first user during the recording process.

Although the disclosure has been described in connection with one or more example embodiments, it should be understood that it is not intended to limit the disclosure to any one particular embodiment. Rather, it is intended to cover all alternatives, modifications and equivalents possible within the spirit and scope of the disclosure as defined by the appended claims.

What is claimed is:

1. A method for using a system including at least one mobile device and at least one detachable camera, the method comprising:

removing the at least one detachable camera from a recess disposed on an external side of the at least one mobile device;
physically positioning the at least one detachable camera in a desired location;
sending a synchronization telecommand from the at least one detachable camera to the at least one mobile device;
allowing the synchronization with the at least one detachable camera and the at least one mobile device;
signaling a status of the at least one detachable camera using at least one Light Emitting Diode (LED) on the at least one detachable camera based on a distance from the at least one mobile device to the at least one detachable camera;
generating an image on a screen of the at least one mobile device, which corresponds to an image being captured by the at least one detachable camera synchronized with the at least one mobile device;
sending, by the at least one mobile device, a telecommand action to the synchronized camera to generate a photo or video of the image being captured by the at least one detachable camera;
performing, by the at least one detachable camera, the corresponding action; and
sending, by the at least one detachable camera, the photo or video generated according to the corresponding action, to the at least one mobile device,
wherein the at least one detachable camera is configured to function both in combination with the at least one mobile device and as an autonomous camera independent of the at least one mobile device, and
wherein a body of the at least one detachable camera includes a flexible polymer and a magnetized polymer.

2. The method according to claim 1, further comprising:
removing another camera from a recess disposed on an external side of another mobile device;
physically positioning the another camera in a desired location;
sending a synchronization telecommand from the another camera to at least one of the at least one mobile device and the another mobile device;
allowing the synchronization with the another camera and the at least one mobile device and the another mobile device;
generating an image on a screen of the at least one mobile device, which corresponds to respective images being captured by both the at least one detachable camera and the another camera which are both synchronized with the at least one mobile device;
sending, by the at least one mobile device, a telecommand action to the synchronized camera and the another camera, to generate respective videos corresponding to the respective images being captured by the at least one detachable camera and the another camera;
performing, by the at least one detachable camera and the another camera, the corresponding action;
sending, by the at least one detachable camera and the another camera, the respective videos generated according to the corresponding action, to the at least one mobile device; and
displaying, by the at least one mobile device, the video sent by the at least one detachable camera and the another video sent by the another camera;
recording, by the at least one mobile device, a video streaming of the video sent by the at least one detachable camera, upon an input received from a user,
wherein if an input is received from the user selecting the another video sent by the another camera, the recording of the video streaming of the video sent by the at least one detachable camera is interrupted, and recording continues from the another video sent by the another camera.

3. The method according to claim 1, wherein:
the connection and synchronization of multiple cameras is performed using a wireless communication protocol.

4. The method according to claim 3, wherein:
the wireless communication protocol includes near field communication.

5. The method according to claim 1, wherein:
photo and/or video generated is saved in an internal memory of the at least one detachable camera.

6. The method according to claim 1, wherein the at least one LED includes a first LED, a second LED, a third LED, and a fourth LED, and the signaling the status includes:
emitting, by the first LED, continuous light of a first color when the at least one detachable camera is turned on,
emitting, by the second LED, continuous light of a second color when the at least one detachable camera focuses,
emitting, by the third LED, continuous light of a third color when power remaining in a battery of the at least one detachable camera is below a predetermined level, and
emitting, by the fourth LED, blinking light when the at least one detachable camera is further than a predetermined distance from the at least one mobile device.

* * * * *

UNITED STATES PATENT AND TRADEMARK OFFICE
CERTIFICATE OF CORRECTION

PATENT NO. : 10,200,583 B2
APPLICATION NO. : 14/483648
DATED : February 5, 2019
INVENTOR(S) : Gomes Da Motta et al.

Page 1 of 1

It is certified that error appears in the above-identified patent and that said Letters Patent is hereby corrected as shown below:

On the Title Page

Item [73] (Assignee), Line 1, Delete "ELETRôNICA" and insert -- ELETRÔNICA --, therefor.

Item [73] (Assignee), Line 2, Delete "AMAZôNIA" and insert -- AMAZÔNIA --, therefor.

Signed and Sealed this
Twenty-third Day of April, 2019

Andrei Iancu
*Director of the United States Patent and Trademark Office*